(12) United States Patent
Wu et al.

(10) Patent No.: US 7,821,453 B2
(45) Date of Patent: Oct. 26, 2010

(54) DISTRIBUTED ITERATIVE MULTIMODAL SENSOR FUSION METHOD FOR IMPROVED COLLABORATIVE LOCALIZATION AND NAVIGATION

(75) Inventors: Shunguang Wu, Robbinsville, NJ (US); Suin-Chuon Mau, Princeton Junction, NJ (US); James Kaba, Millstone, NJ (US); Tao Zhao, Sunnyvale, CA (US)

(73) Assignee: Sarnoff Corporation, Princeton, NJ (US)

( * ) Notice: Subject to any disclaimer, the term of this patent is extended or adjusted under 35 U.S.C. 154(b) by 198 days.

(21) Appl. No.: 12/335,574

(22) Filed: Dec. 16, 2008

(65) Prior Publication Data
US 2009/0212995 A1 Aug. 27, 2009

Related U.S. Application Data

(60) Provisional application No. 61/015,248, filed on Dec. 20, 2007.

(51) Int. Cl.
*G01S 19/45* (2010.01)
*H01Q 3/00* (2006.01)
(52) U.S. Cl. .................................. 342/357.28; 342/372
(58) Field of Classification Search ............ 342/357.28, 342/372
See application file for complete search history.

(56) References Cited

U.S. PATENT DOCUMENTS

2005/0251328 A1* 11/2005 Merwe et al. ................ 701/200

OTHER PUBLICATIONS

P. Bergamo and G. Mazzini, "Localization in sensor networks with fading and mobility Personal," The 13th IEEE International Symposium on Indoor and Mobile Radio Communications, 2002, vol. 2, pp. 750-754.

L. Hu and D. Evans, "Localization for mobile sensor networks," Proc. of Int'l Conf. on Mobile Computing and Networking. Philadelphia, PA, 2004, pp. 45-57.

J.K. Solomon, and Z.H. Lewantowicz, "Estimation of atmospheric and transponder survey errors with a navigation Kalman filter," In Proceedings of the IEEE Aerospace and Electronics Conference, Dayton, OH, 1989, pp. 140-147.

L. Drolet, F. Michaud, and J. Cote "Adaptable sensor fusion using multiple Kalman filters", In Proc. Int. Conf. Intelligent Robots and Systems (IROS), Takamatsu, Japan, 2000, pp. 1434-1439.

P.M. Lee, B.H. Jeon, S.M. Kim, et al., "An integrated navigation system for autonomous underwater vehicles with two range sonars inertial sensors and Doppler velocity log," In Proc. Conf. IEEE Techno-Ocean '04, 2004, pp. 1586-1593.

\* cited by examiner

*Primary Examiner*—Thomas H Tarcza
*Assistant Examiner*—Harry Liu
(74) *Attorney, Agent, or Firm*—Lowenstein Sandler PC

(57) ABSTRACT

A computer implemented method for fusing position and range measurements to determine the position of at least one node of a plurality of distributed nodes is disclosed. The method includes (a) measuring the position of at least one node; (b) computing an estimate of the position of the at least one node based on the measured position using a filter that takes account of past estimates of position; (c) receiving an estimate of position of at least a second node; (d) measuring inter-node range to the at least a second node; (e) combining the measured inter-node range with the estimate of position of at least a second node using a second filter that takes account of past estimates of position to generate a refined estimate of the position of the at least one node; and (f) when a change in the position of the at least one node is above a predetermined threshold value, setting the refined estimate of the position of the at least one node to the estimate of the position of the at least one node and repeating (c), (e), and (f).

28 Claims, 10 Drawing Sheets

Use of Deployable Anchor Nodes to Bound Ambiguity (Error)

2-Dimensional Graphical Example:

0 Anchor Nodes — Full Translational Ambiguity, Full Rotational Ambiguity — Higher Error

1 Anchor Node — No Translational Ambiguity, Constrained Rotational Ambiguity (Freedom to Pivot About 1 Fixed Point) — Lower Error

2 Anchor Nodes — No Translational Ambiguity, No Rotational Ambiguity (No Freedom to Pivot) — Lowest Error

FIG. 7

DISTRIBUTED ITERATIVE MULTIMODAL SENSOR FUSION METHOD FOR IMPROVED COLLABORATIVE LOCALIZATION AND NAVIGATION

CROSS-REFERENCE TO RELATED APPLICATIONS

This application claims the benefit of U.S. provisional patent application No. 61/015,248 filed Dec. 20, 2007, the disclosure of which is incorporated herein by reference in its entirety.

GOVERNMENT RIGHTS IN THIS INVENTION

This invention was made with U.S. government support under contract number N00014-06-C-0489. The U.S. government has certain rights in this invention.

FIELD OF THE INVENTION

The present invention relates generally to navigation systems, and more particularly, to a method and apparatus for locating people/navigable vehicles by fusing inertial and range sensor observations in a GPS denied environment.

BACKGROUND OF THE INVENTION

It is desirable in many applications to estimate absolute and relative 3-D position and orientation for people and objects using low-cost, small size, weight and form-factor navigation devices. In recent times, the Global Positioning System (GPS) for military and civilian applications has been the technology of choice for fulfilling this need. Unfortunately, GPS may be unavailable in several situations where the GPS signals become weak, corrupted, or non-existent. Such situations include urban canyons, indoor locations, underground locations, or areas where GPS signals are being jammed or subject to RF interference. Thus there are several applications where people/objects are operating in environments where GPS is not accessible, which may include civil and military applications such as security, intelligence, and emergency first responder activities.

A traditional technique for obtaining 3-D locations of mobile people/objects (hereinafter "nodes") is by means of trilateration. In trilateration, the position of a mobile node can be calculated using the known positions of multiple RF reference beacons (anchors) and measurements of the distances between the mobile node and the anchors. The anchor nodes can pinpoint the mobile node by geometrically forming four or more spheres surrounding the anchor nodes which intersect at a single point that is the location of the mobile node. Unfortunately, this technique has strict infrastructure requirements, requiring at least three anchor nodes for a 2D position and four anchor nodes for a 3D position. The technique is further complicated by being heavily dependent on relative node geometry and suffers from accuracy errors due to RF propagation complexities.

Many other sensor networks are based on position measurements in such techniques as received signal strength (RSS), the angle of arrival (AoA), the time of arrival (ToA) or time difference of arrival (TDoA) of signals between nodes, including stationary anchor nodes. There are two disadvantages for such approaches: (i) anchor nodes are an infrastructure that is inconvenient in certain applications, like soldiers behind enemy lines; (ii) estimation ambiguities such as translation, orientation, and flip exist for a network without enough anchor nodes. Ambiguities can be eliminated by deploying a sufficient number of anchor nodes in a mobile sensor network, but this incurs the increased infrastructure costs of having to deploy multiple anchor nodes. Inertial navigation units (INUs), consisting of accelerometers, gyroscopes and magnetometers, may be employed to track an individual node's position and orientation over time. Highly accurate INUs are typically expensive, bulky, heavy, power-intensive, and may place limitations on node mobility. INUs with lower size, weight, power and cost are typically also much less accurate. Such systems using only inertial navigation unit (INU) measurements have a divergence problem due to the accumulation of drift error, while systems based on internode ranging for sensor localization suffer from flip and rotation ambiguities.

The localization problem has been studied both in the sensor-network and sensor-fusion communities. In the sensor-network community, several general surveys summarized different aspects of the technology, but only a few works have considered localization with mobile nodes. In P. Bergamo and G. Mazzini, "Localization in sensor networks with fading and mobility Personal," *The 13th IEEE International Symposium Indoor and Mobile Radio Communications*, 2002, vol. 2, pp 750-754 (hereinafter "Bergamo and Mazzini"), a scheme is proposed to perform localization of mobile nodes based on the estimation of the power received by two beacons in an area of 100 m×100 m. Under the assumptions that (i) the two anchor nodes are deployed at two corners of a rectangular space, and (ii) the power can transmit across the entire network, the actual distance between the sensor and the beacons is derived and the node position can be obtained by means of triangulation. Bergamo and Mazzini also demonstrate that mobility makes localization more difficult and the errors increased with the increasing of node speed. In L. Hu and D. Evans, "Localization for mobile sensor networks," *Proc. of Int'l Conf. on Mobile Computing and Networking*. Philadelphia, Pa., 2004, pp 45-57 (hereinafter "Hu and Evans"), it is argued that the mobility of the sensor network can improve both the accuracy and precision of localization by using the sequential Monte Carlo localization technique. The simulation results of Hu and Evans show that it outperforms the best known static localization schemes under a wide range of conditions such as low density of seed nodes, irregular node distributions, and uncontrollable motions of both seeds and nodes. However, the approaches of Bergamo and Mazzini and Hu and Evans each require deployment of a minimum number of anchor nodes in a system.

In the sensor-fusion community, the localization problem has been solved by fusing the observations from different modality of sensors. J. K. Solomon, and Z. H. Lewantowicz, "Estimation of atmospheric and transponder survey errors with a navigation Kalman filter," In *Proceedings of the IEEE Aerospace and Electronics Conference*, Dayton, Ohio, 1989, pp 140-147, INUs, range and range-rate sensors are fused to precisely localize the position of an airplane. L. Drolet, F. Michaud, and J. Cote "Adaptable sensor fusion using multiple Kalman filters", In *Proc. Int. Conf. Intelligent Robots and Systems (IROS)*, Takamatsu, Japan, 2000, pp. 1434-1439, ("Drolet et al.") another sensor fusion strategy is presented for positioning an underwater remotely operated vehicle by using multiple Kalman Filters. P. M. Lee, B. H. Jeon, S. M. Kim, et al., "An integrated navigation system for autonomous underwater vehicles with two range sonars inertial sensors and Doppler velocity log," In *Proc. Conf IEEE TECHNO-OCEAN '04*, 2004, pp: 1586-1593 ("Lee et al."), an integrated navigation system is introduced for autonomous underwater vehicles with inertial and acoustic sensors. The Lee et al. system was implemented under an Extended Kalman Filter (EKF) framework.

The cited works in sensor-network community rely again on anchor nodes, and structural ambiguities are not avoided. The work in the sensor-fusion communities does not exploit the collaborative effect of networking in the form of drift reduction of individual nodes enabled by range constraints.

Several of the above-mentioned methods for obtaining location estimates are centralized, in which data is collected from distributed nodes by a central node at a central location. Centralization puts a strain on bandwidth and throughput, and may suffer from increased latency times due to the high amount of data being transferred, since all of the measurement data needs to be communicated to one location. Centralized algorithms are also inherently unreliable in the case where the central node is disabled or loses communication with other nodes.

Accordingly, what would be desirable, but has not yet been provided, is a system and method for effectively and automatically fusing location and range measurements to determine the position of distributed nodes in GPS-denied environments while reducing the drift errors associated with inertial measurement units.

SUMMARY OF THE INVENTION

The above-described problems are addressed and a technical solution is achieved in the art by providing a computer implemented method for fusing location and range measurements to determine the position of at least one node of a plurality of distributed nodes, comprising the steps of (a) measuring the position of at least one node; (b) computing an estimate of the position of the at least one node based on the measured position using a filter that takes account of past estimates of position; (c) receiving an estimate of position of at least a second node; (d) measuring inter-node range to the at least a second node; (e) combining the measured inter-node range with the estimate of position of at least a second node using a second filter that takes account of past estimates of position to generate a refined estimate of the position of the at least one node; and (f) when a change in the position of the at least one node is above a predetermined threshold value, setting the refined estimate of the position of the at least one node to the estimate of the position of the at least one node and repeating steps (c), (e), and (f). The method may further comprise the step of: (g) estimating an initial position of the at least one node before step (a);

Steps (b), (e), and (g) may further comprise computing a measure of confidence in an estimate of position of the at least one node, wherein the measure of confidence is a covariance. Step (c) may further comprise the step of sending the estimate of the position of the at least one node to the at least a second node. Step (f) may further comprise the step of sending the refined estimate of the position of the at least one node to the at least a second node during the repetition of step (c).

The filter that takes account of past estimates of position in step (b) may be a Kalman Filter. The second filter that takes account of past estimates of position in step (e) may be an Extended Kalman Filter.

The change in the position of the at least one node in step (g) may be a change in position between the refined estimate of position and the second estimate of position. Step (g) may terminate after a predetermined maximum number of iterations.

The corresponding apparatus may comprise: a local position measurement device for (a) measuring the position of the at least one node; an inter-node data communication device for (b) receiving an estimate of position of at least a second node; an inter-node measurement device (c) measuring inter-node range to the at least the second node; and at least one processor configured for: (d) computing a second estimate of the position of the at least one node based on the measured position using a filter that takes account of past estimates of position; (e) combining the measured inter-node range with the estimate of position of at least a second node using a second filter that takes account of past estimates of position to generate a refined estimate of the position of the at least one node; and (f) when a change in the position of the at least one node is above a predetermined threshold value, setting the refined estimate of the position of the at least one node to the estimate of the position of the at least one node and repeating steps (c), (e), and (f). The at least one processor may further be configured for estimating an initial position of the at least one node before the local position measurement device measures the position of the at least one node.

The local position measurement device may be (but is not limited to) at least one of an internal navigation system (INU), and at least one video camera working in conjunction with at least one the processor for measuring distance visually and Doppler radar. The inter-node measurements device and the inter-node data communication device may comprise (but is not limited to) an RF ranging device. The RF ranging device may comprise radar working in conjunction with the at least one processor; a radio transceiver; and at least one antenna.

A node's position accuracy may improve by a factor of $\sqrt{n}$ when it collaborates as part of an n-node group, or conversely, the absolute position error decreases by a factor of $1/\sqrt{n}$.

BRIEF DESCRIPTION OF THE DRAWINGS

The present invention will be more readily understood from the detailed description of exemplary embodiments presented below considered in conjunction with the attached drawings, of which:

FIG. 7 graphically illustrates one possible explanation for the Anchor Effect exhibited by embodiments of the present invention;

It is to be understood that the attached drawings are for purposes of illustrating the concepts of the invention and may not be to scale.

DETAILED DESCRIPTION OF THE INVENTION

Figure 1:
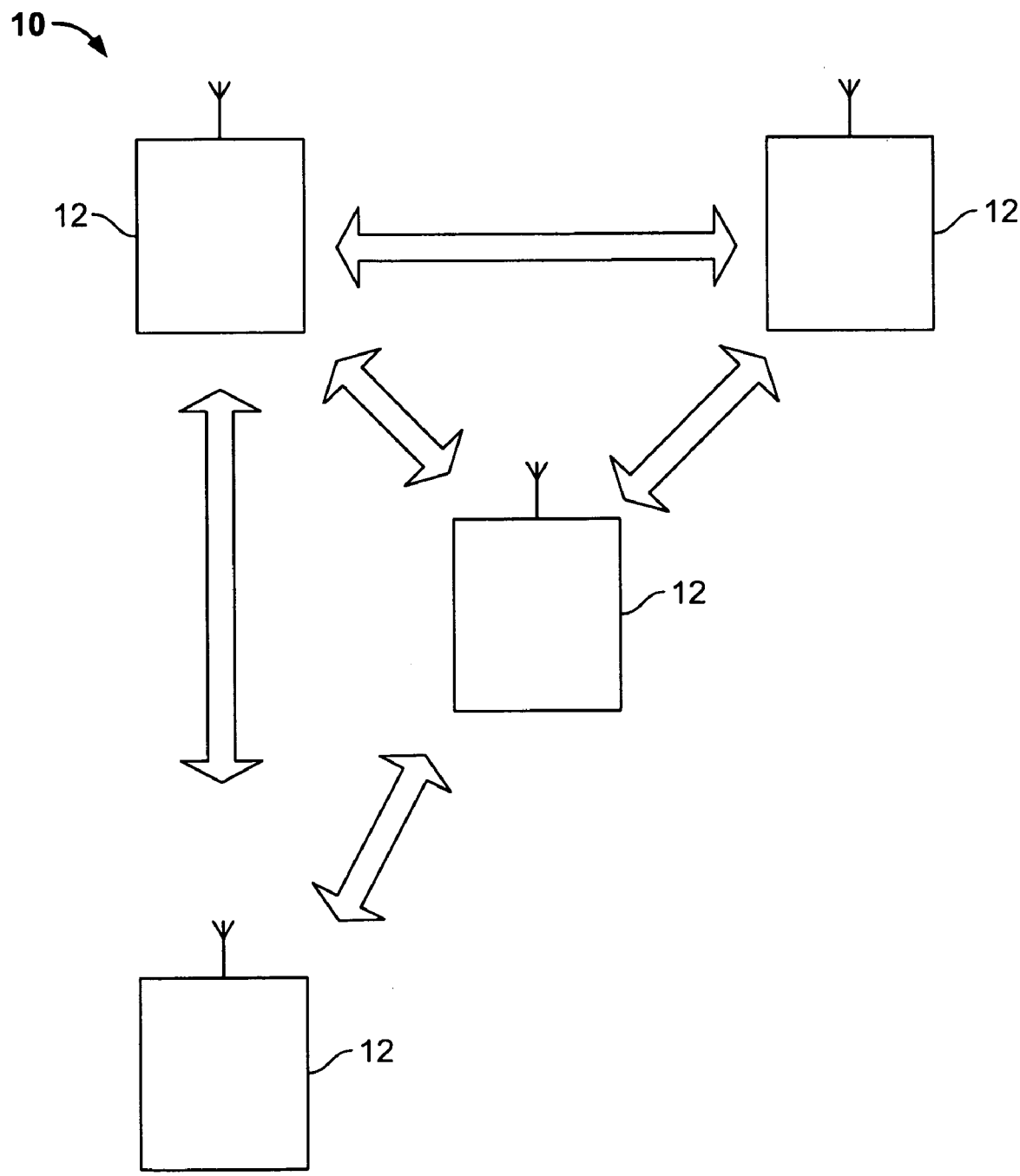
FIG. 1 is a block diagram of an exemplary navigation system for determining the position of at least one node in GPS-denied environments, constructed in accordance with an embodiment of the present invention.

Referring now to FIG. 1, a navigation system for determining the position of at least one node in GPS-denied environments is depicted, constructed in accordance with an embodiment of the present invention, generally indicated at 10. The system 10 includes an n-node sensor network comprising a plurality of nodes 12 (people, objects, navigable entities) which communicated with each other wirelessly. In a preferred embodiment, there is no one central node. Each of the nodes 12 determines its own position by means of local position measurement devices and by means of obtaining range measurements between each node 12 and its nearest neighbors(s). Range measurements to neighboring nodes 12 may be obtained by on-board ranging equipment and by receiving/exchanging position measurements wirelessly with neighboring nodes 12. Individual local inertial navigation units (INUs), being subject to drift error, have their position measurements constrained using the exchanged radio frequency (RF) range measurements. Each node 12 has a processor unit which computes the observations from INU and RF sensors, and sensors also communicate with each other to exchange limited information to improve the estimation results. Anchor nodes are optional. The system 10 is dynamically scalable, requiring a minimum of two nodes up to N nodes where N is an integer greater than two. Nodes 12 may move in and out of range with neighboring nodes.

Figure 2:
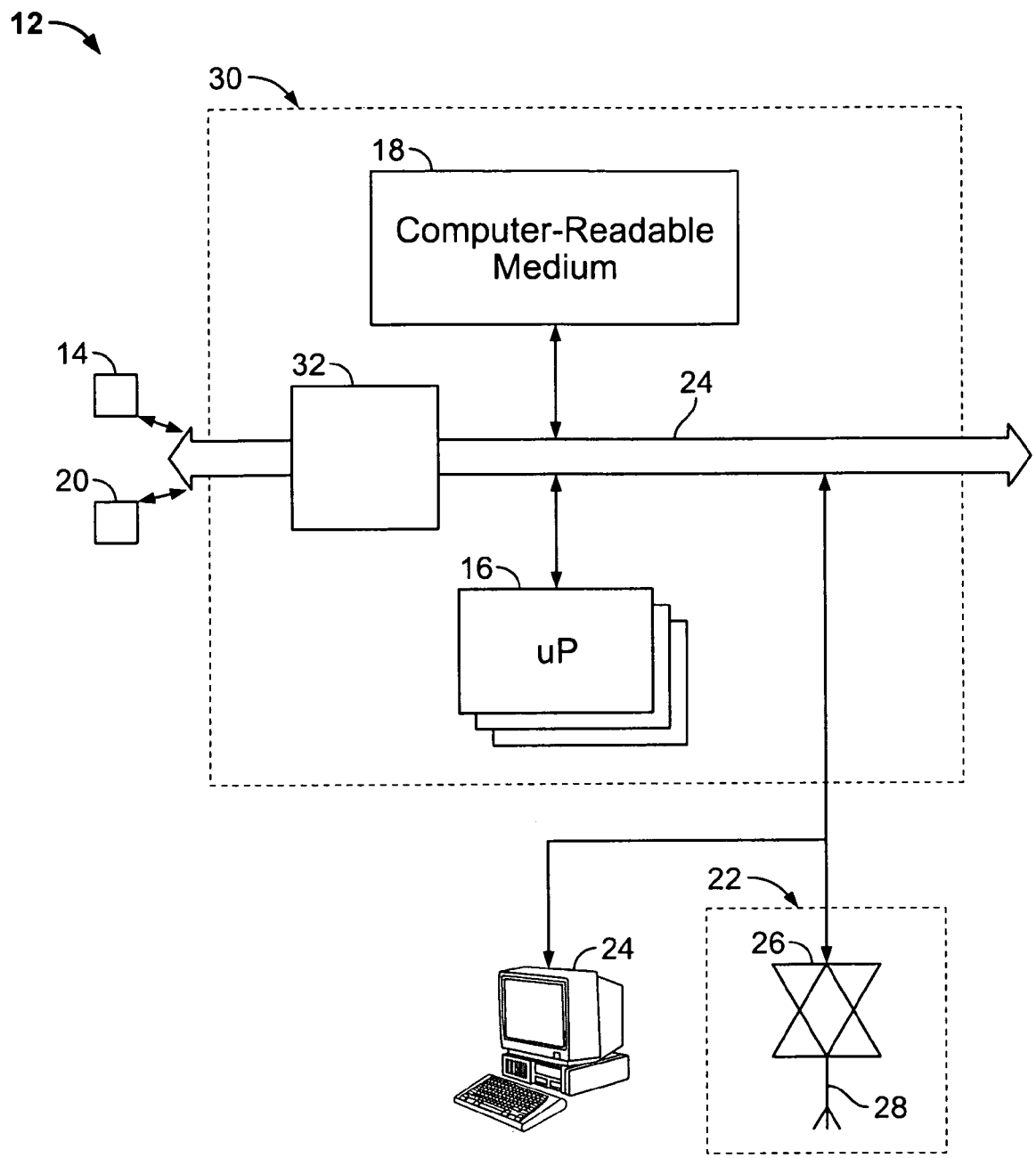
FIG. 2 is a block diagram of the hardware architecture of an individual node in the navigation system of FIG. 1, constructed in accordance with an exemplary embodiment of the present invention.

Referring now to FIG. 2, an individual node 12 is depicted, constructed in accordance with an exemplary embodiment of the present invention. The node 12 includes a local position measurement device 14, at least one processor 16, a computer readable medium 18, an inter-node measurement device 20, an inter-node data communication device 22, and a display 24. The local position measurement device 14 may be an internal navigation system (INU) (e.g., 3-axis accelerometers, rate sensors, magnetometers, perhaps augmented with a pressure altimeter). In other embodiments, the local position measurement device 14 may comprise one or more video cameras working in conjunction with the processor 16 and the computer readable medium 18 for measuring position visually. In still other embodiments, the local position measurement device 14 may be Doppler radar. The inter-node measurements device and the inter-node data communication device 22 may comprise an RF ranging device such as radar working in conjunction with the at least one processor 16, the computer readable medium 18, a radio transceiver (receiver and transmitter) 26 and one or more antennas 28. The inter-node measurement device is not limited to RF ranging devices, but may be any device that measures range. Such a general purpose RF ranging device may be a radio that measures the round trip time of flight of a radio signal exchanged between two radios. The display 24 provides a visual indication of local and neighbor position information to a user (not shown).

The node 12 can comprise a computing platform 30. The computing platform 30 may include an embedded system, personal computer, or work-station (e.g., a Pentium-M 1.8 GHz PC-104 or higher) comprising one or more processors 16 which includes a bus system 32 which receives incoming measurement data and which outputs outgoing instructions to the local position measurement device 14, the inter-node measurement device 20, and the inter-node data communication device 22. The received data on the bus system 32 may be processed directly by the one or more processors 16 or fed to the computer-readable medium 18 for later processing by the one or more processors 16. The computer readable medium 18 may also be used for storing computer program instructions for controlling the node 12 to be executed by the one or more processors 16, including an operating system, such as the Windows or the Linux operating system. The computer readable medium 18 can further be used for the storing and retrieval. The computer readable medium 18 can include a combination of volatile memory, such as RAM memory, and non-volatile memory, such as flash memory, optical disk(s), and/or hard disk(s).

As described in FIGS. 1 and 2, embodiments of the present invention consider an n-node sensor network. Each node 12 has a processor unit 16 which computes the observations from INU and RF sensors 14, 16, 22, and sensors also communicate with each other to exchange limited information to improve the estimation results. The initial inertial measurement(s) are used for obtaining an initial estimate of node self-location. Then, range measurements to other nodes are taken. The local position measurements are exchanged with the other nodes 12 in the system 10. The local and exchanged position measurements are used to refine and update the local position estimate. If the resulting updated estimate is considered "good enough," then the measurement algorithm terminates, otherwise, the updated position estimates are iteratively exchanged with neighbors until the difference between a previous estimate of local position and the current estimate is below a user defined threshold. Since all of the nodes in the system 10 are exchanging and refining their local position estimates, the accuracy of the measurements for all of the nodes 12 may converge within a few iterations.

In a distributed approach for determining the self-location of a node according to embodiments of the present invention, the position of each node can be estimated by an independent computation unit with very limited communications to exchange the positions of other nodes. The proposed method addresses the problem of localizing both absolute and relative positions of mobile sensor network nodes by fusing inertial navigation unit (INU) and radio frequency (RF) ranging measurements in a distributed way. In this approach, the state vector of any node in the sensor network at time index k is represented by $$x_k = [x, \dot{x}, y, \dot{y}, z, \dot{z}]_k^T.$$

It is assumed that each of the sensors may move with a constant velocity. The constant velocity model is also used to approximate the kinematics of a node, i.e., $$x_k = F_{k-1} x_{k-1} + v_{k-1},$$

where $v_{k-1} \propto N(0, Q_{k-1})$, $F_{k-1} = \text{diag}(F_0, F_0, F_0)$, $Q_{k-1} = \text{diag}(\sigma_x^2 Q_0, \sigma_y^2 Q_0, \sigma_z^2 Q_0)$, and $F_0$ and $Q_0$ are determined by the constant velocity model assumed for each sensor.

The measurement vectors from INU and RF range sensor are $$z_{inu}(k)=[\dot{x}, \dot{y}, \dot{z}]_k^T,$$

and $$z_{rf}(k)=[r_1, r_2, \ldots, r_{n-1}]_k^T,$$

respectively. $r_i$ is the distance between current node and the ith node for $i=1, \ldots, n-1$.

Assuming $\sigma_x$, $\sigma_y$, and $\sigma_z$ are the INU measurement uncertainty standard deviations (STDs), the measurement equations for an INU sensor can be modeled as $$z_{inu}(k)=H_k x_k + w_{INU}(k),$$

where $H_k$ is a constant mapping matrix from state space to measurement space, $w_{inu}(k) \propto N(0, R_{inu}(k))$, with $R_{inu}(k)=\text{diag}(\sigma_x(k), \sigma_y(k), \sigma_z(k))$.

Suppose the estimated positions of the other $n-1$ nodes at $t_k$ are $(\hat{x}_i, \hat{y}_i, \hat{z}_i)$ the $n-1$ RF observation equations can be expressed as $$r_1(k) = \sqrt{(x(k) - \hat{x}_1(k))^2 + (y(k) - \hat{y}_1(k))^2 + (z(k) - \hat{z}_1(k))^2} + w_i^{(RF)}(k),$$
$$(i = 1, \ldots, n-1).$$

where $w_i^{(RF)}(k) \propto N(0, \sigma_d(k))$, and the whole RF range measurement covariance matrix is $R_k^{(RF)} = \text{diag}(\sigma_d(k), \sigma_d(k), \ldots, \sigma_d(k))$.

By using the standard Extended Kalman Filter (EKF) algorithm, the state vector of each node can be estimated in parallel. However, since the estimation results of one node are strongly dependent on the estimated positions of other nodes, a single iteration is not likely to accurately estimate the positions of the entire network.

To solve this problem, an iterated distribution algorithm for an exemplary embodiment of the present invention is proposed. In this algorithm, (i) each of the nodes estimates its state by using its INU observation and obtains RF range measurements to all other nodes, (ii) each of the nodes sends out this estimation to all other nodes, (iii) the RF ranges measurements are used to re-estimate each node's state by EKF. After several iterations between (ii) and (iii) the state of each node will converge to its optimization point.

The algorithm disclosed is computationally efficient and requires minimal communication overhead. The communication that is required is limited to nearest neighbor communication only. Nodes can communicate position and confidence estimates only, rather than raw measurements or intermediate filter state variables, to minimize communication overhead. The algorithm converges to a solution rapidly (e.g. in 2-3 iterations). The algorithm is resilient to measurement errors, measurement dropouts, and variations in measurement rates. This results in an algorithm that is extremely well suited for implementation on low-cost, small form factor devices.

Figure 3:
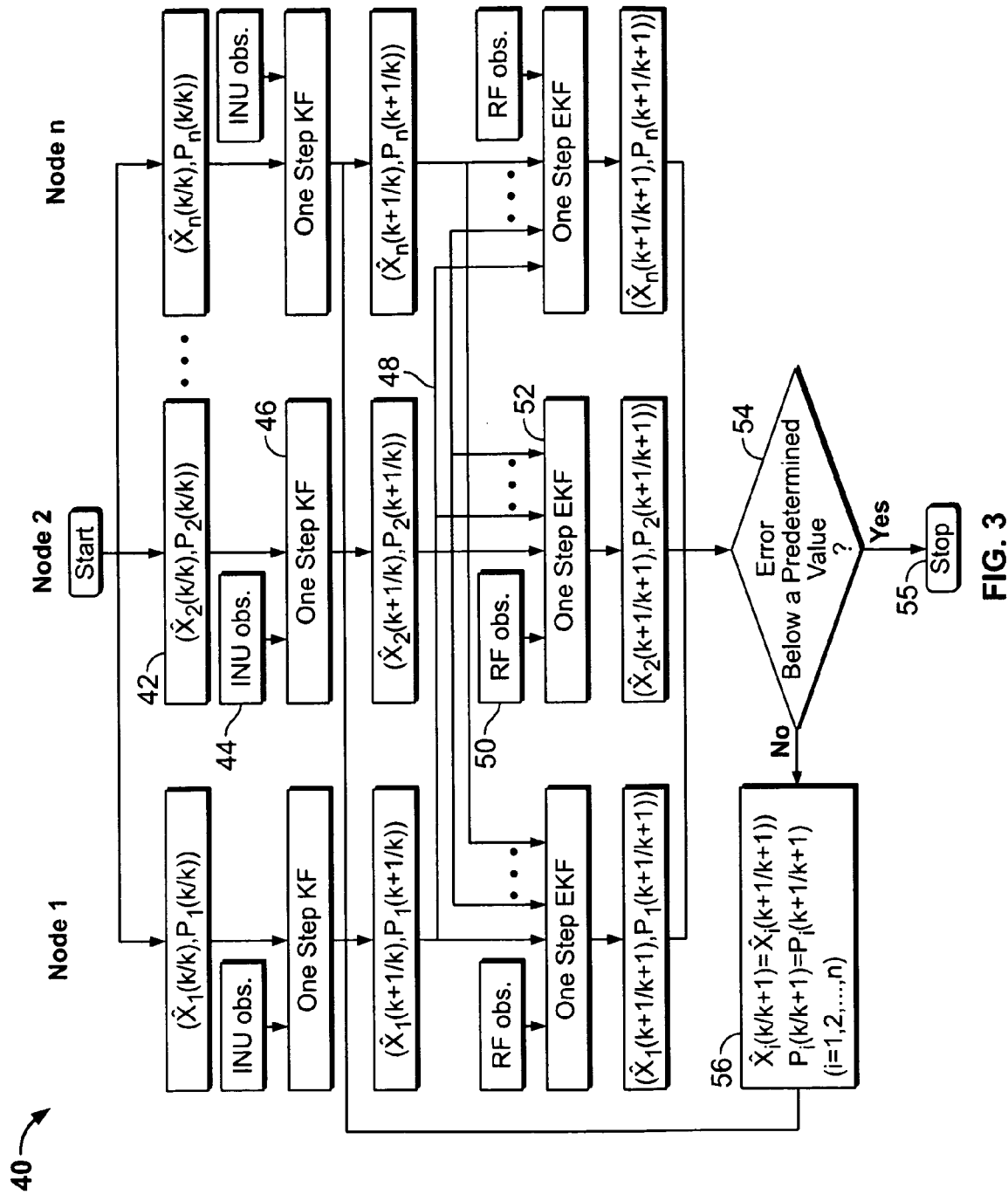
FIG. 3 is an exemplary process flow of a fusion algorithm for determining the position of at least one node in GPS-denied environments, constructed in accordance with an embodiment of the present invention.

Referring now to FIG. 3, a flow diagram 40 of the proposed fusion algorithm considers an n-node sensor network. Focusing, for example, on node 2, at step 42, node 2 computes an initial estimate of its own position $(\hat{x}_2(k|k), P_2(k|k))$. Optionally, node 2 can also compute its confidence in the measurement of its own position. In some embodiments, confidence is expressed as a probability, wherein the position $\hat{x}_2$ is modeled as a linear Gaussian random variable (It has been experimentally shown that embodiments of the present invention achieve similar results if the position variable is non-linear and/or non-Gaussian). In a preferred embodiment, the probability is the covariance for time index k. At step 44, a position measurement is made with the local position measurement device 14 of FIG. 2, preferably with an INU measurement observation at time index k+1. At step 46, a position estimate is made at time k+1 based on the INU measurement using a filter that takes account of past history estimates to produce a second estimate of position $(\hat{x}_2(k+1|k), P_2(k+1|k))$. In the general case, the filter may constrain noisy "local" position measurements with inter-node constraints. In a preferred embodiment, the filter is a Kalman filter. At step 48, node 2 exchanges position estimates with its neighbors using the inter-node data communication device 22 of FIG. 2. In some embodiments, node 2 exchanges position measurements with at least one of its nearest neighbors. In a minimal configuration, node 2 receives an estimate of the position of at least one of its nearest neighbors. At step 50, node 2 makes an inter-node range measurement to at least one of its neighbors, preferably to each neighbor using the inter-node measurement device 20 of FIG. 2. At step 52, node 2 combines the inter-node range observations with each neighbor's position estimate from step 50 using a filter that takes account of past history estimates, preferably with an extended Kalman filter to generate an updated position estimate $(\hat{x}_2(k+1|k+1), P_2(k+1|k+1))$. In the general case, as with the filter of step 46, the filter of step 52 may constrain noisy "local" position measurements with inter-node constraints. At step 54, a stop check is made by comparing the results at steps 46 and 52 to determine if additional position refinement is required. If the change in position estimate is below a predetermined value, then at step 55, the method terminates. In a preferred embodiment, the change in position estimate is a change in distance between the updated position measurement and a previous position estimate (e.g., the output updated position measurement from step 52 and the second estimate of position input to step 52). If additional position refinement is required (i.e., the change in position estimate is above a predetermined threshold), then at step 56, the updated position estimate $(\hat{x}_2(k+1|k+1), P_2(k+1|k+1))$ is set to the second position estimate $(\hat{x}_i(k|k+1)=\hat{x}_i(k+1|k+1))$, $(P_i(k|k+1)=P_i(k+1|k+1))$, $(i=1, 2, \ldots n)$ and node 2 exchanges this new second position estimate with (at least one) neighboring node(s). Steps and steps 48, 52, 54, and 56 are repeated until the updated position estimate has converged to a satisfactory degree (i.e., the change in distance is below a predetermined threshold) or if a predetermined maximum number of iterations have been exceeded.

In some embodiments, the updated position estimate takes account of the confidence values (covariances $P_i$) by using the confidence value as a weighting factor to combine current and previous position measurements of node 2 and at least one of its neighbors with past position measurements to arrive at the updated position measurement of node 2.

In the situation where no neighboring nodes are available, no distance measurements are made and no position refinements are made, but a sole node still computes its own position estimates using its own local position measurement device. (i.e., the algorithm at steps 42, 44 and 46 repeatedly executes to obtain updated position estimates of the sole node).

The system and method of the present invention has numerous advantages over prior art GPS-denied navigational algorithms. Disclosed embodiments of the method of the present invention are computationally efficient and requires minimal communication overhead. The communication that is required may be limited to nearest neighbor communication only. The algorithm may converge to a solution rapidly (e.g., in 2-3 iterations) to within difference in an updated and a previous updated position measurement of 1 cm. The algorithm is resilient to measurement errors, measurement dropouts, and variations in measurement rates. The algorithm is scalable, i.e., it can handle an unlimited number of nodes, and is capable of handling asynchronous sensor inputs from new nodes that enter the range of nearest neighbors or which drop out of range, similar to a mobile cellular phone interacting with cell towers.

More particularly, the method of the present invention may take advantage of what is called the "Teamwork Effect." The Teamwork Effect allows nodes operating in groups to achieve significantly better navigational accuracy than when operating individually. The teamwork effect can be stated as an error scaling law of the form $\epsilon(n) \propto \epsilon(1)/\sqrt{n}$ where $\epsilon$ the measurement error and n is the number of nodes employing the method of the present invention for navigation, i.e., a node's position accuracy improves by a factor of $\sqrt{n}$ when it collaborates as part of an n-node group, or conversely, the absolute position error decreases by a factor of $1/\sqrt{n}$.

To illustrate the Teamwork Effect more rigorously, it is assumed that a network has n nodes, where n can be either fixed or dynamically changing. Each node moves under its own kinematics; there is no correlation between each node; and the initial positions of each node are given. There are two kinds of measurements: (i) the displacement of each node between two time instants (from INUs), and (ii) the distance between any two nodes within a certain range at each time instant (from RF ranging). The task is to estimate the position of each node at all subsequent time instants onwards in a global fixed coordinate system.

This problem can be visualized as a graph, where the nodes are random variables and the links are the constraints (statistical dependencies). The problem is to estimate the values of the variables (the nodes) given the constraints (the links). If only a single value is needed for each variable as the best solution, then the problem can be formed as a MAP (maximum a posteriori) estimation problem. This directly corresponds to the following optimization problem, $$\{v_1, \ldots, v_n\}^* = \mathrm{argmax}_{\{v_1, \ldots, v_n\}} \prod_{p \in P} p(e_1, \ldots, e_m \mid v_1, \ldots, v_n)$$

where $v_1, \ldots, v_n$ are the nodes and $e_1, \ldots, e_m$ are the links, and P is the set of likelihood functions of all constraints.

However, even before solving for the node positions, general statements can be made about the drift rates of node positions. The following analysis only requires the existence of sufficiently accurate ranging capabilities and is more general than the current framework.

Figure 4:
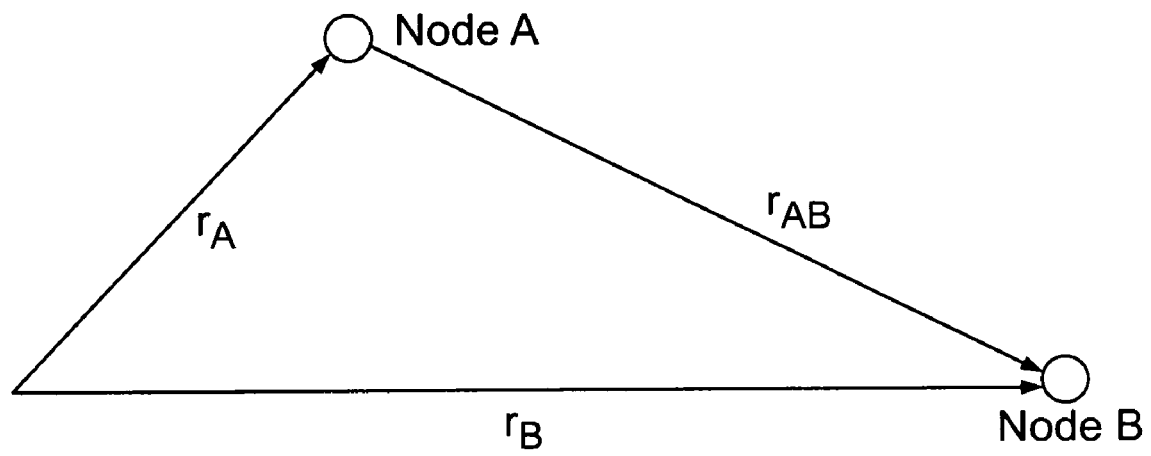
FIG. 4 is a diagram illustrating the averaging of independent INU drift errors using an accurate relative ranging measurement by employing the systems of FIGS. 1-3.

FIG. 4 is a diagram illustrating the averaging of independent INU drift errors using an accurate relative ranging measurement. As illustrated in FIG. 4, $r_A$ and $r_B$ are vectors representing the INU estimates of the positions of nodes A and B, respectively. $r_{AB}$ is the more accurate RF ranging estimate of the position of node B relative to node A. The position of node A can be estimated by the average of $r_A$ (its own INU) and $r_B - r_{AB}$ (INU of node B and the position of B relative to A). If $r_A$ and $r_B$ have independent errors of common size $\sigma_{INU}$, and the error of $r_{AB}$ is negligible compared to it, then this average is statistically optimal, and have the reduced error of $\sigma_{INU}/\sqrt{2}$. The position error of B can be reduced similarly.

To understand how error can be further reduced when more nodes are available for RF ranging, a standard error propagation rule is stated for averaging independent measurements. The error of an average of n independent and identically distributed (iid) measurements with common error $\sigma$ is $\sigma/\sqrt{n}$. That is, if $y=(x_1+\ldots+x_n)/n$, and $x_i$'s ($i=1, \ldots, n$) are iid's with common standard deviation $\sigma_x$, then $\sigma_y = \sigma_x/\sqrt{n}$.

Figure 5:
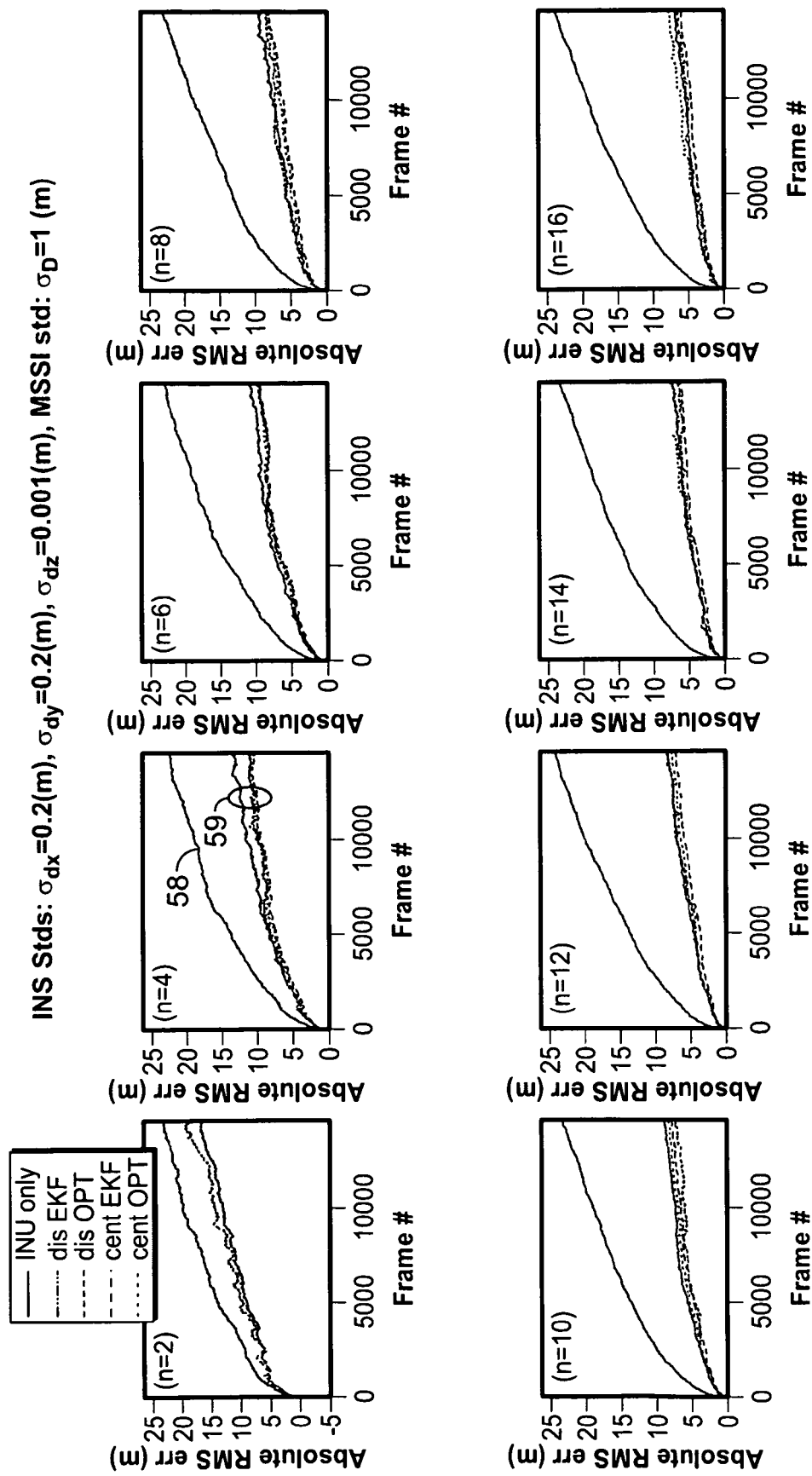
FIG. 5 depicts plots of absolute error as a function of time for multiple multimodal sensor fusion algorithms, including the method of the present invention, illustrating the "Teamwork Effect"

Referring now to FIG. 5, plots of absolute error as a function of time for multiple multimodal sensor fusion algorithms, including the method of the present invention, illustrating the "Teamwork Effect," are depicted. As shown in FIG. 5, the amount of error decreases as the number of nodes in a network increases; illustrated network sizes range from 2 to 16 nodes. The line 58 shows performance when using INU-only. Distributed algorithms compare favorably to centralized algorithms based on the disclosed sensor fusion algorithm. Note from the other graphs 59 that error is within a few meters even after 4 hours and 20 km of GPS-denied operation. The graphs 59 show that independent inertial drift errors are constrained using inter-node range measurements, and substantial performance gains (factors of 2 or 3) can be realized even with small numbers of users.

For a size-n network with perfect communication, a given node has n independent INU position estimates. One from its own INU, the rest n-1 are based on the INU position estimates of the rest n-1 nodes, range measurements, and previous fused position estimates. The n independent INU estimates are the reason for the $1/\sqrt{n}$ improvement.

In practice, with continuous INU measurements and previous fused position estimates, instead of needing the relative position of B from A, only the distance between them is needed for the scaling result to hold, because INU observations and previous fused estimates virtually eliminates ambiguities like flips, translations, and rotations.

Figure 6:
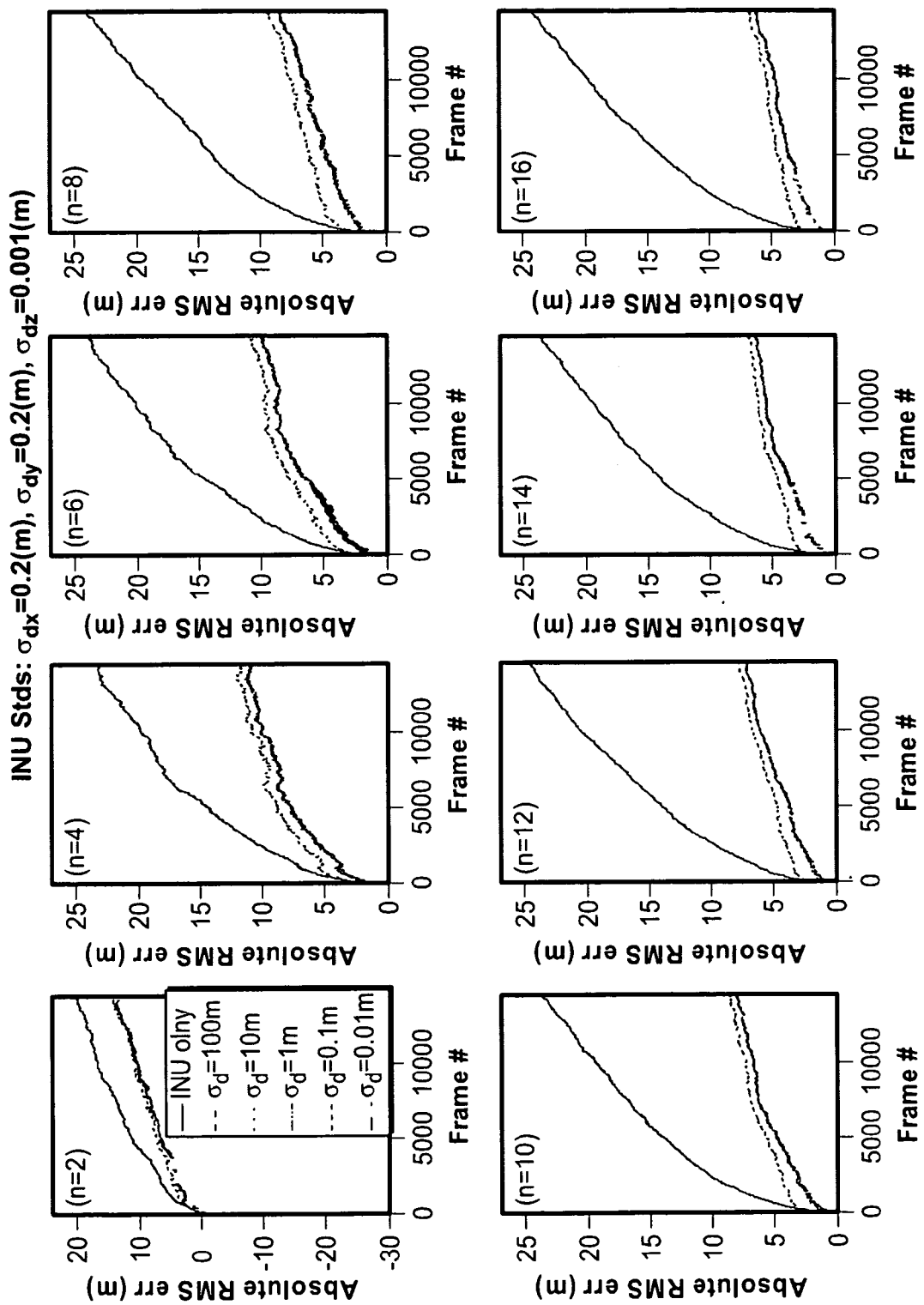
FIG. 6 shows graphs of absolute RMS errors as a function of frame number (time) for the performance of several multimodal sensor fusion algorithms, including the method of the present invention, illustrating that the "Teamwork Effect" holds even with very inaccurate ranging constraints.

The derived error scaling law assumes highly accurate node ranging capabilities compared to the less accurate INU measurements. Referring now to FIG. 6, absolute RMS errors as a function of frame number for the performance of several multimodal algorithms, including the method of the present invention, are presented. The graphs of FIG. 6 illustrate what happens when the accuracy of range measurements are varied in factors of 10, from a very imprecise 100 m standard deviation down to a very precise 1 cm standard deviation accuracy. FIG. 6 shows that the multimodal fusion algorithm of the present invention tolerates inaccuracies of the inter-node range constraints. Absolute system error is bounded to very low levels using even very course range constraints, with a very tight grouping of absolute position error for all other accuracies up to 10 m. There is significant system error reduction even for 100 m ranging error. Relative position error is bounded to within a few meters. Most significantly, the $\sqrt{n}$ Teamwork Effect error scaling law holds even with very inaccurate ranging constraints.

Embodiments of the present invention exhibit a second error reduction effect known as the "Anchor Effect." The Anchor Effect comes into play when anchor nodes or reference beacons are deployed. As opposed to the mobile nodes described hereinabove, anchor nodes/reference beacons have fixed locations and position estimates and errors that do not grow with time. Deployable anchor nodes have zero INS drift error wherein position estimates and error remains constant. Experiments have shown that even with the deployment of a single anchor node used in conjunction with embodiments of the method of the present invention can increase system accuracy by a factor of between 2 and 3. Deploying two anchor nodes may bound the absolute system error to 1 m Spherical Error of Probability (SEP). Classical uses of reference beacons typically require a greater number of beacons to be effective.

FIG. 7 graphically illustrates one possible explanation for the Anchor Effect. With zero anchor nodes as depicted with the triangles 60, the use of inter-node RF range constraints allows for maintaining very good relative position accuracy even as the absolute error grows with time. Relative node orientation is pretty well defined, but there is a possibility for full translational and rotational ambiguity—so, without anchor nodes, the absolute error can still continue to grow. With the position of just one of these nodes being fixed and used as an anchor as depicted by the triangles 62, there is no translational ambiguity and the rotational ambiguity is constrained. Absolute error can continue to grow, but at a lower rate. If the position of two nodes is fixed as depicted by the triangles 64, there is no translational and rotational ambiguity, and absolute error growth is highly constrained. Thus, embodiments of the present invention can achieve significant performance improvements with minimal numbers of anchor nodes.

Figure 8:
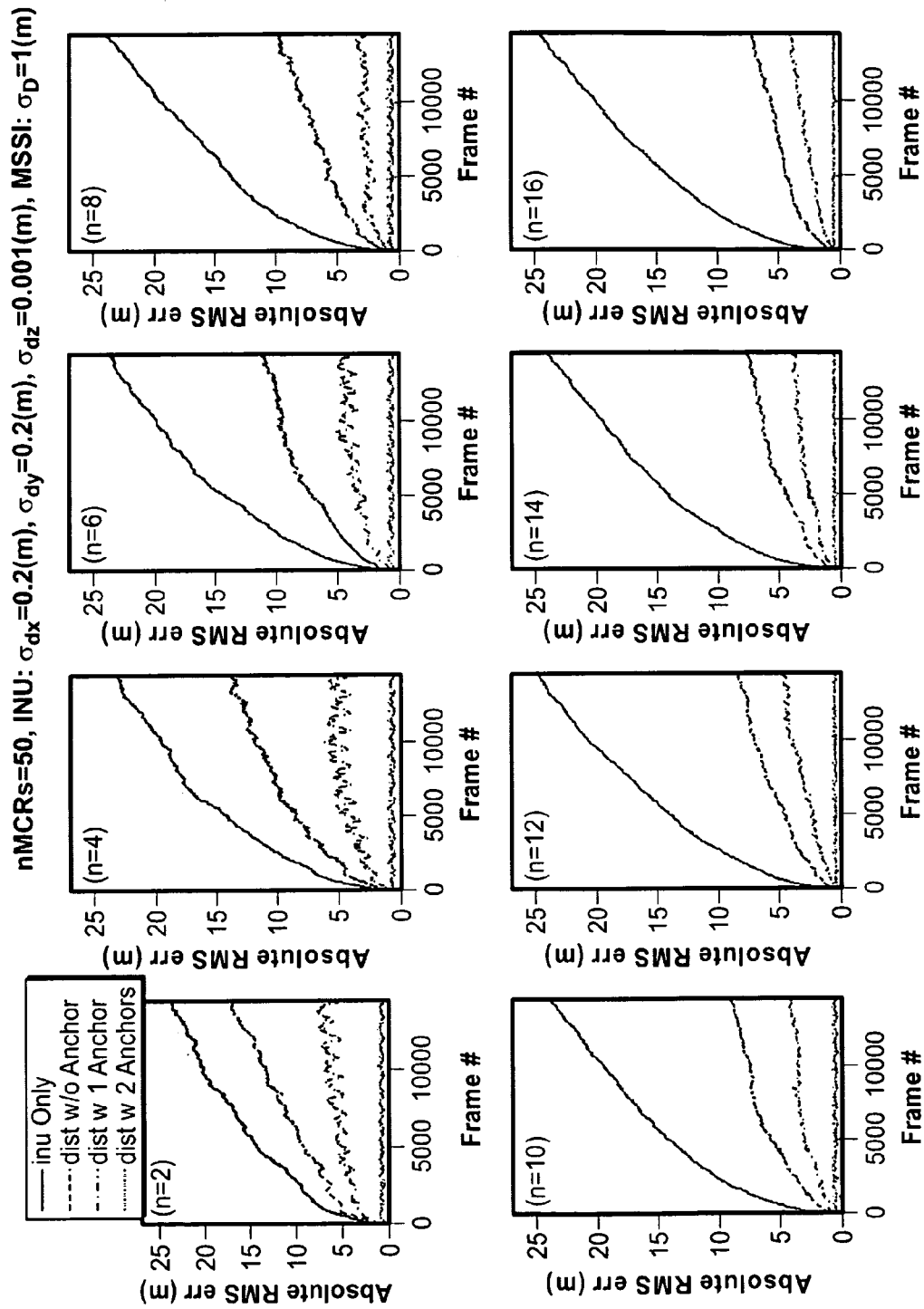
FIG. 8 depicts plots of simulation results that exhibit the effects of using anchor nodes with embodiments of the present invention.

FIG. 8 depicts plots of simulation results that exhibit the effects of using anchor nodes with embodiments of the present invention. In the graphs, zero, one, or two anchor nodes are deployed at the start of a simulation, and the growth of absolute RMS error over time is observed for varying network sizes from 2 to 16 nodes. From the graphs, it is observed that about a 3× performance improvement is obtained for small networks, approaching about a 2× performance improvement for larger network sizes. When a second anchor node is introduced at the start of the simulation, the absolute error is bounded to a low level of about 1 or 2 m SEP, while relative position accuracy remains bounded to less than 1 M SEP throughout the simulation.

A third error reduction effect is known as "Reset Effect," which is a type of "opportunistic" effect. What is meant by Reset Effect is that continual refinement of position estimates can result in estimates that improve, rather than degrade, over time. The inaccurate position estimates of mobile nodes are "reset" to a lower level in the middle of a mission even after those errors have grown. Thus, the Reset Effect may provide immediate, rather than gradual, improvement of the estimate accuracy. The Reset Effect may occur under the following conditions: (a) a mobile node whose position error has grown establishes contact with a stationary deployable anchor node. The mobile node's position estimate, and its confidence in accuracy of that estimate, will improve; (b) a mobile node whose position error has grown establishes contact with another mobile node with a better location certainty; and (c) an individual or a small group of mobile nodes merges with another group of mobile Nodes, forming a larger group allowing for collectively better error performance (e.g., due to the "Teamwork Effect").

The Reset Effect is demonstrable for deployable anchor nodes and large groups of mobile nodes. The Reset Effect may enable teams of warfighters that split into subgroups and merge some time later to regain the same level of positioning performance as if they had not split. During an encounter with anchor node, since the anchor has high confidence in position accuracy, a mobile node may place more emphasis on the highly accurate anchor node position than on it's own degraded position estimate. This condition may also hold true for encounters with mobile node(s) with higher position accuracies. With regard to merging teams, the mathematical expression for position/error depends on number of neighbors N only at time t=T, which is independent of N for t<T and independent of the specifics of how/when position estimates were computed for all t<T.

Figure 9:
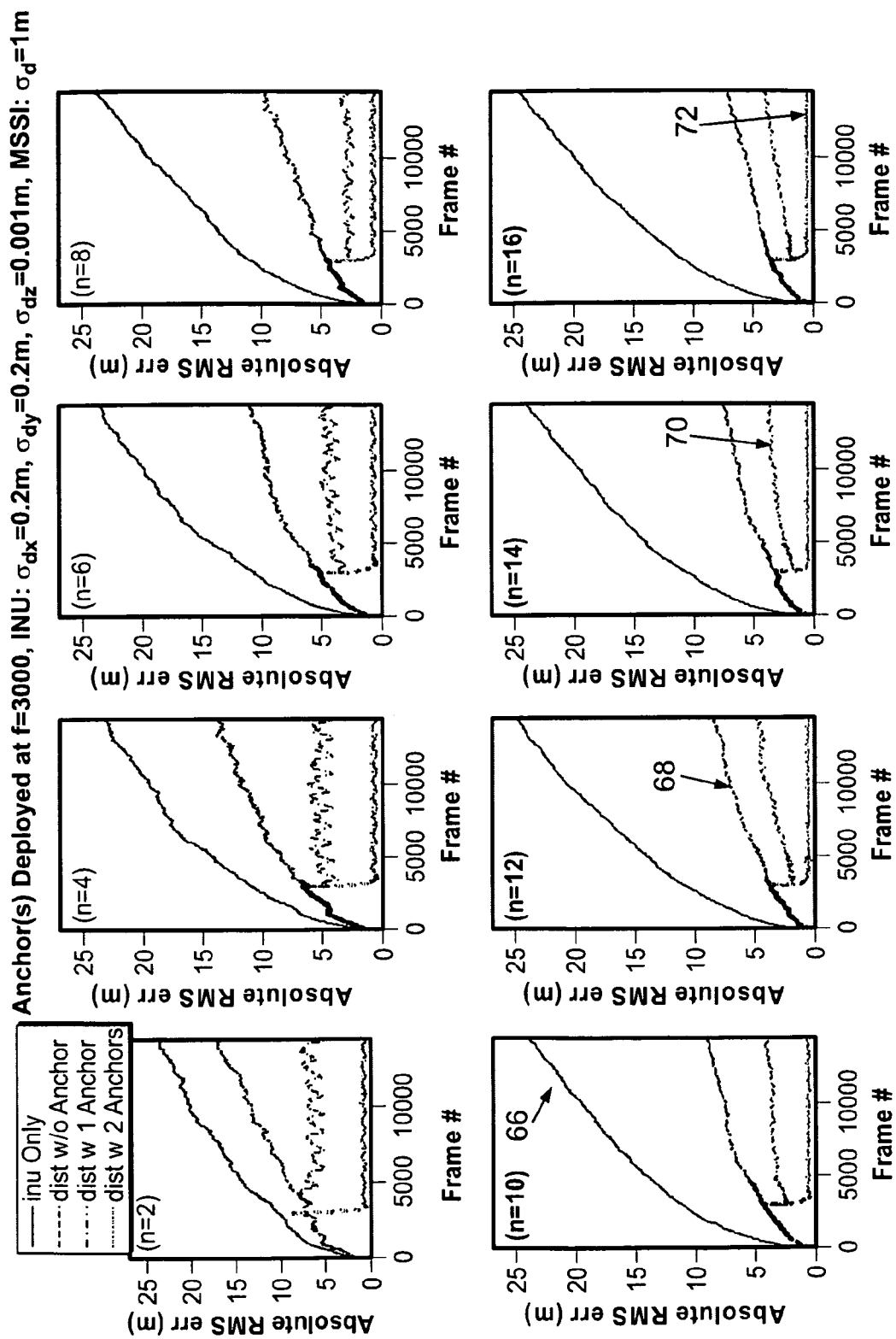
FIG. 9 depicts a collection of graph simulations that illustrate the "Reset Effect" during an encounter of a mobile node with an anchor node when employing embodiments of the present invention.

FIG. 9 depicts a collection of graph simulations that illustrate the "Reset Effect" during an encounter of a mobile node with an anchor node. The graphs show unaided operation 66, RF-aided operation 68, a mobile node's encounter with an anchor node 70, and the resulting error reset 72 for an encounter with two anchor nodes. Notice that during an opportunistic encounter with one or two anchor nodes 70, 72, the mobile node's error "resets" to a lower level substantially instantaneously.

Figure 10:
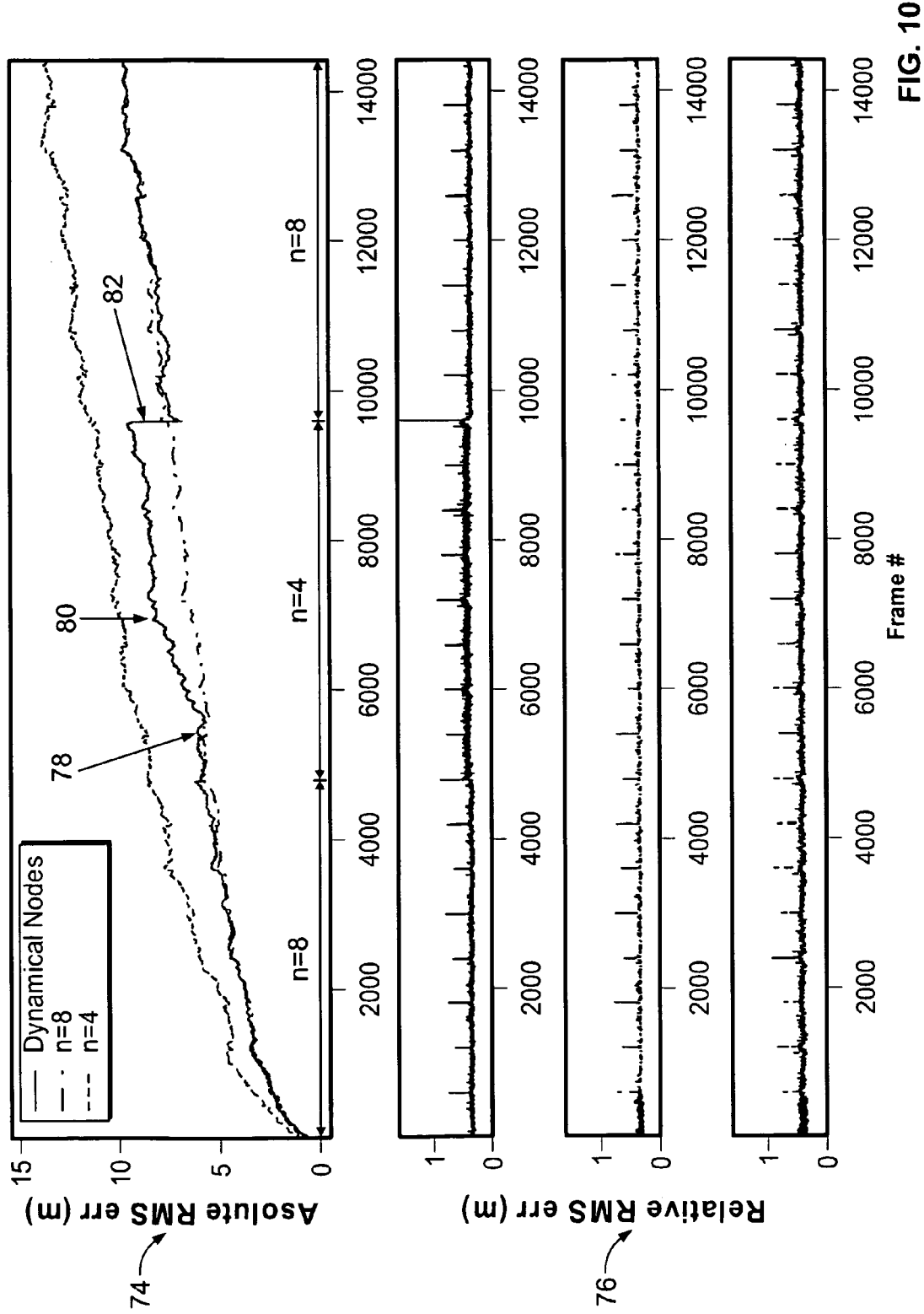
FIG. 10 depicts graphs of absolute error and relative error when one group of mobile nodes encounters another group of nodes, both groups employing the system and method of the present invention.

FIG. 10 depicts graphs of absolute error 74 and relative error 76 when one group of mobile nodes encounters another group. On the absolute error graph 74, there is shown the location 78 where an 8-node team splits onto two 4-node teams, a location 80 where the split teams operate independently, and a location 82 where the two 4-node teams re-merge. Note that at the location of the merge 82, error for each node of each of the teams "resets" to a lower level of error. This effect not only affects error rate (the curve slope), but absolute error as well.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer implemented method for fusing position and range measurements to determine the position of at least one node of a plurality of distributed nodes, comprising the steps of:
   (a) measuring the position of at least one node,
   (b) computing an estimate of the position of the at least one node based on the measured position using a filter that takes account of past estimates of position;
   (c) receiving an estimate of position of at least a second node;
   (d) measuring inter-node range to the at least a second node;
   (e) combining the measured inter-node range with the estimate of position of at least a second node using a second filter that takes account of past estimates of position to generate a refined estimate of the position of the at least one node, and
   (f) when a change in the position of the at least one node is above a predetermined threshold value, setting the refined estimate of the position of the at least one node to the estimate of the position of the at least one node and repeating steps (c), (e), and (f).

2. The method of claim 1, further comprising the step of:
   (g) estimating an initial position of the at least one node before step (a).

3. The method of claim 2, wherein steps (b), (e), and (g) further comprise computing a measure of confidence in an estimate of position of the at least one node.

4. The method of claim 3, wherein the measure of confidence is a covariance.

5. The method of claim 3, wherein the measure of confidence is used as a weighting factor to combine current and previous position measurements of the at least one node and the at least a second node with past position measurements to arrive at the refined estimate of the position of the at least one node.

6. The method of claim 1, wherein step (c) further comprises the step of sending the estimate of the position of the at least one node to the at least a second node.

7. The method of claim 1, wherein step (f) further comprises the step of sending the refined estimate of the position of the at least one node to the at least a second node during the repetition of step (c).

8. The method of claim 1, wherein the filters in steps (c) and (e) constrain noisy (local) position measurements with inter-node constraints.

9. The method of claim 1, wherein the filter that takes account of past estimates of position in step (c) is a Kalman Filter.

10. The method of claim 1, wherein the second filter that takes account of past estimates of position in step (e) is an Extended Kalman Filter.

11. The method of claim 1, wherein the change in the position of the at least one node in step (f) is a change in distance between the refined estimate of the position of the at least one node and the estimate of the position of the at least one node.

12. The method of claim 1, wherein step (f) terminates after a predetermined number of iterations.

13. The method of claim 1, wherein the number of neighboring nodes in the plurality of distributed nodes changes dynamically.

14. An apparatus for fusing position and range measurements to determine the position of at least one node of a plurality of distributed nodes, comprising:
   a local position measurement device for (a) measuring the position of the at least one node;
   an inter-node data communication device for (b) receiving an estimate of position of at least a second node;
   an inter-node measurement device (c) measuring inter-node range to the at least the second node; and
   at least one processor configured for:
      (d) computing an estimate of the position of the at least one node based on the measured position using a filter that takes account of past estimates of position;
      (e) combining the measured inter-node range with the estimate of position of at least a second node using, a second filter that takes account of past estimates of position to generate a refined estimate of the position of the at least one node, and
      (f) when a change in the position of the at least one node is above a predetermined threshold value, setting the refined estimate of the position of the at least one node to the estimate of the position of the at least one node and repeating steps (c), (e), and (f).

15. The apparatus of claim 14, wherein the at least one processor is further configured for estimating an initial position of the at least one node before the local position measurement device measures the position of the at least one node.

16. The apparatus of claim 14, wherein the local position measurement device is an internal navigation system (INU).

17. The apparatus of claim 14, wherein the local position measurement device comprises at least one video camera working in conjunction with at least one the processor for measuring position visually.

18. The apparatus of claim 14, wherein the local position measurement device is Doppler radar.

19. The apparatus of claim 14, wherein the inter-node measurements device and the inter-node data communication device comprise an RF ranging device.

20. The apparatus of claim 14, wherein the RF ranging device comprises:
   radar working in conjunction with the at least one processor;
   a radio transceiver; and
   at least one antenna.

21. The apparatus of claim 14, wherein the inter-node measurement device is a radio that measures the round trip time of flight of a radio signal exchanged between two radios.

22. The apparatus of claim 14, wherein the at least one processor is further configured for computing a measure of confidence in an estimate of position of the at least one node.

23. The apparatus of claim 14, wherein the inter-node data communication device is further configured for sending the second estimate of the position of the at least one node to the at least a second node.

24. The apparatus of claim 14, wherein the inter-node data communication device is further configured for sending the refined estimate of the position of the at least one node to the at least a second node during the repetition of (b).

25. The apparatus of claim 14, wherein the filter that takes account of past estimates of position in (d) is a Kalman Filter.

26. The apparatus of claim 14, wherein the second filter that takes account of past estimates of position in (e) is an Extended Kalman Filter.

27. The apparatus of claim 14, wherein the change in the position of the at least one node in (e) is a change in distance between the refined estimate of position and the second estimate of position.

28. The apparatus of claim 14, wherein (f) terminates after a predetermined number of iterations.

* * * * *